(12) United States Patent
Rode

(10) Patent No.: US 7,651,099 B1
(45) Date of Patent: Jan. 26, 2010

(54) SYSTEMS AND METHODS FOR SEALING BETWEEN STATORS AND ROTORS

(76) Inventor: John E. Rode, Persee Rd., P.O. Box 1127, Fonda, NY (US) 12068

( * ) Notice: Subject to any disclaimer, the term of this patent is extended or adjusted under 35 U.S.C. 154(b) by 0 days.

(21) Appl. No.: 11/386,972

(22) Filed: Mar. 22, 2006

Related U.S. Application Data

(62) Division of application No. 10/891,838, filed on Jul. 15, 2004, now Pat. No. 7,293,778.

(51) Int. Cl.
 *F16J 15/34* (2006.01)
(52) U.S. Cl. .................................. 277/306; 277/370
(58) Field of Classification Search ................ 277/377, 277/379, 385, 370, 404, 407
See application file for complete search history.

(56) References Cited

U.S. PATENT DOCUMENTS

| | | | | |
|---|---|---|---|---|
| 3,241,844 A | * | 3/1966 | Morley | 277/370 |
| 3,874,680 A | * | 4/1975 | Mustoe et al. | 277/405 |
| 4,212,475 A | * | 7/1980 | Sedy | 277/400 |
| 5,201,533 A | * | 4/1993 | Lederman | 277/551 |
| 6,283,639 B1 | | 9/2001 | Rode | 384/551 |
| 6,327,773 B1 | | 12/2001 | Rode | 29/724 |
| 6,461,051 B1 | | 10/2002 | Rode | 384/551 |
| 6,478,388 B2 | | 11/2002 | Maguire | 305/103 |
| 7,090,221 B2 | * | 8/2006 | Matsui et al. | 277/352 |

OTHER PUBLICATIONS

Caterpillar Precision Seals website printouts, Apr. 15, 2004.

* cited by examiner

*Primary Examiner*—Peter M Cuomo
*Assistant Examiner*—Jonathan J Liu
(74) *Attorney, Agent, or Firm*—Heslin Rothenberg Farley & Mesiti P.C.; Nicholas Mesiti, Esq.; Victor A. Cardona, Esq.

(57) ABSTRACT

A seal is used between a housing and a shaft having an axis. The seal includes a first portion and a second portion engageable with each other and movable relative to each other. The first portion and the second portion are configured to be received in a cavity between the shaft and the housing. The first portion is engageable with the shaft such that the first portion is substantially stationary relative to the shaft and to inhibit passage of contaminants from the exterior of the cavity through the cavity toward the axis. The second portion is engageable with the housing such that the second portion is substantially stationary relative to the housing and to inhibit passage of the contaminants from the exterior through the cavity toward the axis.

15 Claims, 3 Drawing Sheets

SYSTEMS AND METHODS FOR SEALING BETWEEN STATORS AND ROTORS

CROSS REFERENCE TO RELATED APPLICATIONS

This application is a divisional of U.S. patent application Ser. No. 10/891,838, filed Jul. 15, 2004, the entire disclosure of which is incorporated herein by reference.

TECHNICAL FIELD

This invention relates, generally, to stators and rotors, more particularly, to systems and methods for sealing between stators and rotors.

BACKGROUND ART

A seal may serve to inhibit passage of contaminants to a particular location, for example, a cavity or a space between a stator and a rotor. Such contaminants may include dirt or anything which might inhibit operation of the stator and rotor. For instance, a housing and a spindle extending through the housing may be movable relative to each other such that one more cavities may exist therebetween which are capable of receiving contaminants. The operation of the housing and spindle may be compromised by the passage of such contaminants into these locations.

The housing may comprise, for example, a hub. The spindle may comprise a shaft, axle, or the like. Bearings or bushings may also be present between such stators and rotors to reduce friction therebetween during operation and such bearings may comprise roller bearings, for example, tapered roller bearings. In one example, the tapered roller bearings may be employed in wheel hub and axle assemblies.

Thus, a need exists for seals which inhibit passage of contaminants to cavities between stator and rotors, which are movable relative to one another and which are subjected to environments which includes such contaminants.

SUMMARY OF THE INVENTION

The present invention provides, in a first aspect, a seal for use between a housing and a shaft having an axis. The seal has a first portion and a second portion engageable with each other and moveable relative to each other. The first portion and the second portion are configured to be received in a cavity between the shaft and the housing. The first portion is engageable with the shaft such that the first portion is substantially stationary relative to the shaft and to inhibit passage of contaminants from an exterior of the cavity through the cavity toward the axis. The second portion is engageable with the housing such that the second portion is substantially stationary relative to the housing and to inhibit the passage of the contaminants from the exterior through the cavity toward the axis.

The present invention provides, in a second aspect, a method for sealing a cavity between a shaft and a housing which includes inserting a seal into the cavity between the shaft and the housing. Also, a first portion of the seal is engaged with the shaft such that the first portion is substantially stationary relative to the shaft and to inhibit passage of contaminants from an exterior of the cavity toward an axis of the shaft. The second portion of the seal is engaged with the housing to inhibit the passage of the contaminants from the exterior of the cavity through the cavity toward the axis and such that the second portion is substantially stationary relative to the housing. Also, the first portion and the second portion are engaged with each other to inhibit passage of contaminants from the exterior of the cavity through the cavity toward the axis and such that the first portion and the second portion are moveable relative to each other.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, a seal for use between a housing and a shaft is provided.

Figure 1:
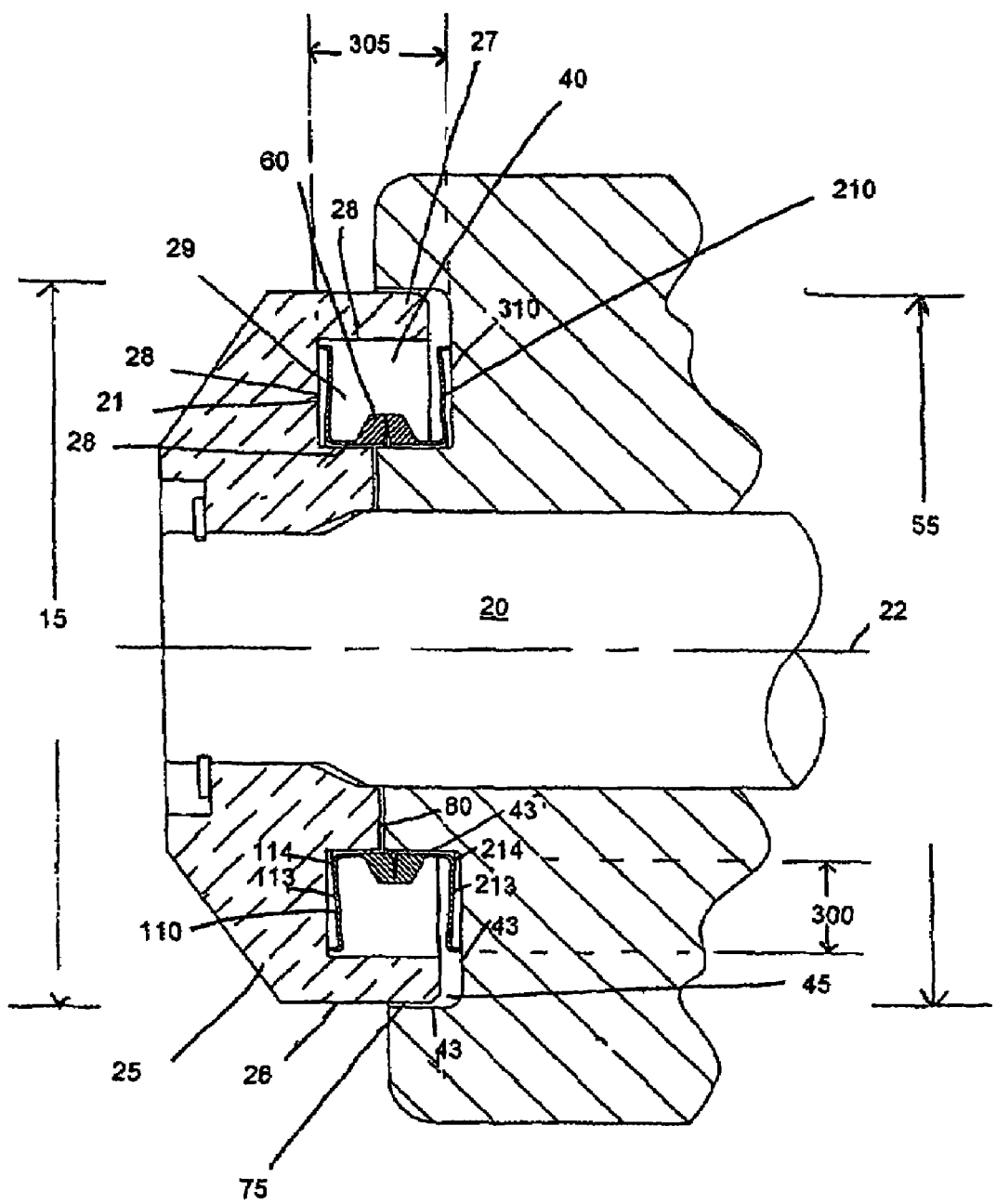
FIG. 1 is a side cross-sectional view of a shaft being received in a housing along with a seal being received in a cavity between the shaft and the housing in accordance with the present invention.
Figure 2:
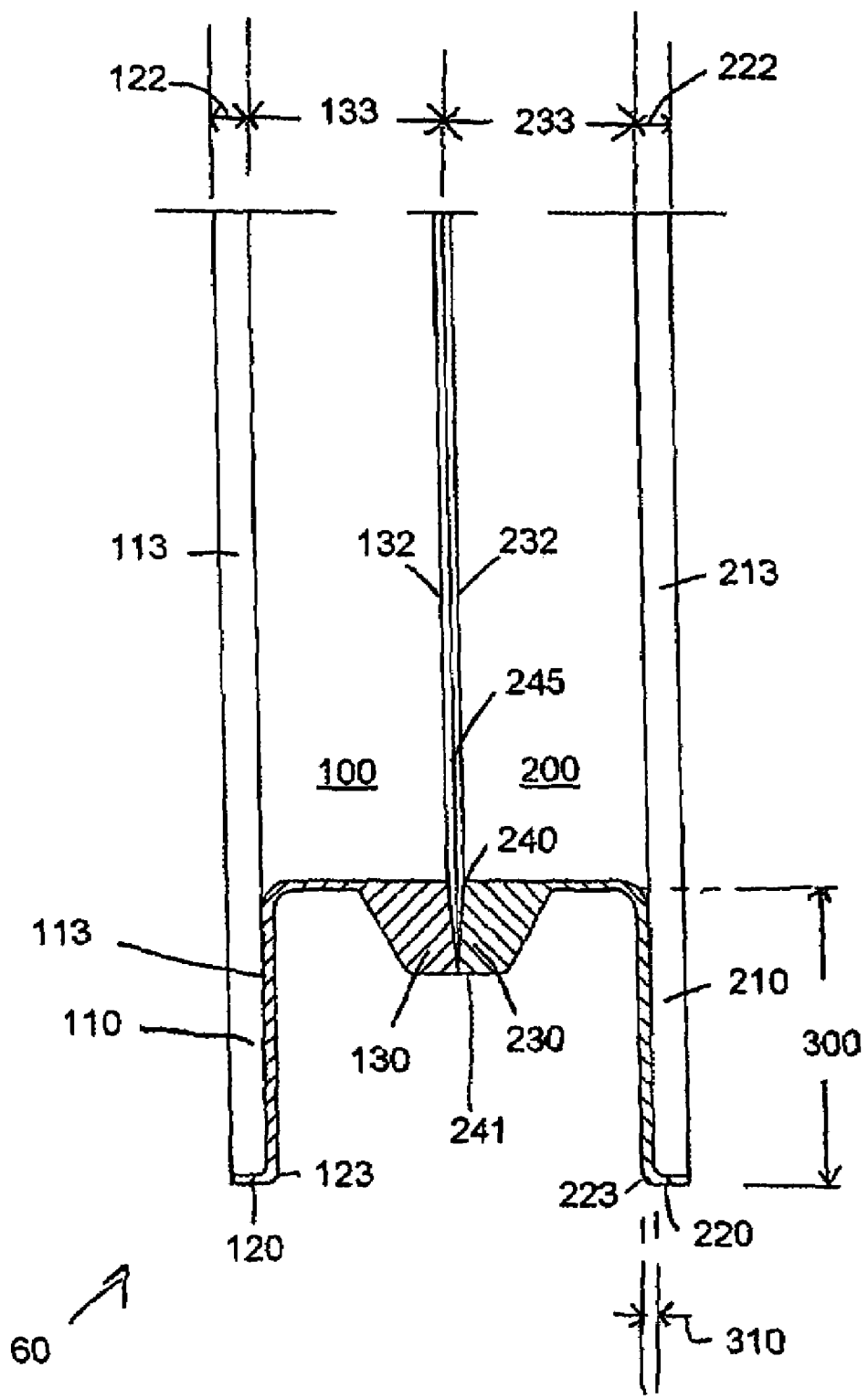
FIG. 2 is a top perspective view of the seal of FIG. 1.

In an exemplary embodiment, a seal 60 for use between a housing 30 and a shaft 20 having an axis is depicted in FIGS. 1-2. Seal 60 includes a first portion 100 and a second portion 200 configured to be received in a cavity 40 between shaft 20 and housing 30.

Shaft 20 includes a shaft head 25 or flange, and cavity 40 is located between shaft head 25 and housing 30. Shaft 20 (e.g., a spindle) may be an axle, a shaft, and/or the like that may rotate within housing 30. For instance, the shaft may comprise an axle of a vehicle such as a bucket loader or other earth moving equipment (e.g., or a shaft of a motor or speed reducer). Alternatively, shaft 20 may remain stationary and an outer housing (e.g., housing 30 or a wheel hub) may rotate thereabout. In one example, housing 30 may receive a wheel utilized in a skid steering mechanism, e.g., for small earth moving equipment such as a bucket loader.

Shaft head 25 has a diameter which allows it to be received in a recess 45 of housing 30. Specifically, an outside diameter 15 of shaft head 25 is less than an outside diameter 55 of recess 45. Cavity 40 is formed by a front edge 27 of shaft head 25 being received in recess 45. Cavity 40 is defined by walls 43 of recess 45, front edge 27, and walls 28 of a shaft head cavity 29 of shaft head 25.

Seal 60 may be received in cavity 40 and may inhibit movement of dirt or other contaminants through cavity 40 toward an axis 22 of shaft 20. Specifically, seal 60 may inhibit or prevent movement or passage of dirt or other contaminants from an exterior of cavity 40 past seal 60 and into a gap 80 or space between shaft head 25 and housing 30. Dirt or other contaminants may enter cavity 40 through a first gap 75 between a surface 26 of shaft head 25 substantially parallel to axis 22 and at an outside diameter of shaft head 25. Thus, seal 60 may prevent or inhibit movement of dirt or other contaminants into gap 80 after they have entered cavity 40 through gap 75. This sealing of gap 80 by seal 60 is advantageous, because the performance of shaft 20 and housing 30 may be adversely affected by the introduction of the contaminants therebetween. Specifically, increased friction may result between shaft 20 and housing 30 if contaminants enter cavity 80. For example, the performance of a vehicle incorporating shaft 20 and housing 30 may be adversely affected due to such increased friction.

First portion 100 and second portion 200 of seal 60 may be engageable with one another (e.g., they may be have complementary mating surfaces), and movable relative to one another, when first portion 100 and second portion 200 are received in cavity 40. First portion 100 may include a first leg 110 having a first axially protruding foot 120, as best depicted in FIG. 2. Second portion 200 may include a second leg 210 having a second axially protruding foot 220.

Returning to FIG. 1, first foot 110 may be configured to engage shaft head 25 to allow first portion 100 to move with shaft 20 as shaft 20 rotates about axis 22. Specifically, first foot 110 may "dig into", or form a recess in, the material forming shaft head 25 such that first portion 100 attaches to, and rotates with, shaft 20. Also, second foot 220 may engage housing 30 such that second portion 200 is stationary with housing 30. Specifically, second foot 220 may "dig into", or form a recess in, the material forming housing 30 such that second portion 200 attaches to, and does not move relative to, housing 30. For example, first foot 110 may "dig into" shaft head 25 and second foot 220 may "dig into" housing 30 on opposite sides of cavity 40. Such attachment by "digging in" may cause a frictional fit between first foot 110 and shaft head 25, and second foot 220 and housing 30. Such "digging in" may also cause a portion of the material being "dug into" to be worn away thereby forming a recess and the "digging in" leg may be received in the recess. The frictional fit may allow first portion 100 to move with shaft 20 and to be substantially stationary relative thereto, while second portion 200 is substantially stationary relative to housing 30. Alternatively, first portion 100 and shaft 20 may remain stationary while second portion 200 and housing 30 may rotate. Further, the frictional fit may also result absent the described "digging in".

Further, the frictional fit described above, whether by "digging in" or without such "digging in", may be caused by shaft head 25 being pressed against housing 30 in an axial direction. More specifically, an engaging wall 21 of cavity walls 28 may contact first leg 110 (e.g., first foot 120) to cause a frictional fit between first leg 110 (e.g. first foot 120) and engaging wall 21, in response to shaft head 25 being pressed toward housing 30 such that front edge 27 is received in recess 45, as described above. Such axial pressure by shaft head 25 on housing 30 may also cause second leg 210 (e.g., second foot 220) to engage an engaging wall 31 of housing 30 to cause a frictional fit between second leg 210 and engaging wall 31. Also, such axial pressure may cause first leg 110 and second leg 210 to move toward each other.

A mating portion 130 of first portion 100 and a mating portion 230 of second portion 200 may engage one another such that first portion 100 and second portion 200 may move or rotate (e.g., about axis 22) relative to each other, as best depicted in FIG. 2. For example, abutting side 132 of mating portion 130 and abutting side 232 of mating portion 230 may include ground finishes to allow such movement therebetween. Also, as depicted in FIG. 2, abutting side 132 and abutting side 232 may extend substantially radially and may be in contact with each other along some or all of such radial distance. For example, abutting side 132 and abutting side 232 may be spaced from one another on an inner radial end 240 and abutting side 132 and abutting side 232 may abut one another on an outer radial end 241. A space 245 between abutting side 132 and abutting side 232 may be tapered between inner radial end 240 and outer radial end 241. Space 245 may be formed by the forming (e.g. machining or casting) of abutting side 132 and abutting side 232 to be beveled or angled along a portion of their radial extents. Also, mating portion 130 and mating portion 230 may interlock with each other, or they may abut one another without interlocking, when received in cavity 40. Further, mating portion 130 and mating portion 230 may be rigidly formed.

Returning to FIG. 1, first leg 110 and second leg 210 may be formed of resilient materials allowing elastic compression or deformation of the legs toward one another particularly in response to a force (e.g., an axial force) being applied to shaft head 25 toward housing 30 (or vice versa), when seal 60 is received in cavity 40. The use of such resilient materials allows dirt or other contaminants to be excluded from gap 80 between shaft head 25 and housing 30. More specifically, the potential energy stored when first leg 110 and second leg 210 are moved toward each other may provide a force against shaft 20 and housing 30, respectively, such that the frictional fit described above may inhibit movement of contaminants between first leg 110 and shaft 20, along with second leg 120 and housing 30, in response to a release of the force. Also, seal 60 may be formed of tool steel in one example. Other materials suitable for form seal 60 include spring steel or plastic (e.g., DELRIN-type plastic).

Further, the mating portions and the feet of seal 60 may be dimensioned to facilitate the elastic deformability described above. More specifically, an axial dimension 133 of first mating portion 130, an axial dimension 233 of second mating portion 230, an axial dimension 122 of first foot 120, and an axial dimension 222 of second foot 220 may be dimensioned relative to one another to allow the elastic deformability described above. For example, axial dimension 122 of first foot 120 may be of a length or distance such that a central portion 113 and top portion 114 of first foot 110 are spaced from shaft head 25, when seal 60 is received in cavity 40 and first foot 120 abuts shaft head 25. Similarly, axial distance 222 of foot 220 may be configured such that a central portion 213 and top portion 214 of second foot 210 are spaced from housing 30, when second foot 220 abuts housing 30.

Further, axial dimension 133 of first mating portion 130 and axial dimension 233 of second mating portion 230 may have axial distances to allow a space between top portion 114 and top portion 214, respectively, when seal 60 is received in cavity 40 such that first foot 120 abuts shaft head 25 and second foot 220 abuts housing 30. Alternatively, axial dimension 133 and axial dimension 233 could be of lengths such that they abutt shaft head 25 and housing 30, respectively. In either case, a combination of axial dimension 133 and axial dimension 233 are substantially equal to an axial dimension 305 of cavity 40. The forming of axial dimension 133 and axial dimension 233 to cover this distance (i.e., axial dimension 305) allows axial dimension 122 of first foot 120 and axial dimension 222 of second foot 220 to cause inner radial portion 123 of first foot 120 and inner radial portion 223 of second foot 220 to be forced in a substantially axial direction toward each other a distance substantially equal to the axial dimensions of first foot 120 and second foot 220. The potential energy stored by forcing first foot 120 towards second foot 220 in this manner causes the "digging in" described above.

Further, the elastic deformability of first portion 100 and second portion 200 allows shaft 20 and housing 30 to move relative to one another in axial, rotational, and radial directions without contaminants passing seal 60 and entering cavity 80. For example, first leg 110 second leg 210 may be deformed toward one another and/or away from one another while remaining attached to shaft 20 and housing 30, respectively, in response to axial movement of shaft head 25 toward and/or away from housing 30. Further, shaft head 25 may move radially due to the presence of gap 75 while seal 60 continues to inhibit the passage of contaminants toward cavity 80. Moreover, rotational movement of shaft 20 relative to housing 30 does not affect the described sealing ability of seal 60. More specifically, the elastic deformability of seal 60 allows it to be deformed in response to a stress (e.g. a radial, axial or rotational stress) while allowing it to return to a previous position in response to a release of the stress, thereby allowing it to remain attached to shaft 20 and housing 30. Accordingly, such continued attachment inhibits contaminants from passing by seal 60 toward gap 80.

Moreover, a radial dimension 300 of first leg 110 and second leg 210 may be formed of various lengths to increase or decrease the elasticity of seal 60 depending on the desired performance thereof. Also, a thickness 310 in an axial direction of first leg 110 and second leg 210 may be manipulated to regulate the elasticity of seal 60. For example, increased elasticity may be desired for a seal in a system which is subject to movement or thermal growth (i.e., variation in size depending on temperature). More specifically, first leg 110 and second leg 210 may be relatively longer and less thick if increased elasticity is desired. On the contrary, if a particular environment is not subject to significant movement or thermal variation, first leg 110 and second leg 220 may be relatively shorter and thicker.

In one embodiment, seal 60 could be plastically deformed a predefined amount by compressing shaft 20 against housing 30 with any further deformation being elastic. This allows a certain adjustment of seal 60 while retaining the resilient characteristics which allow movement between shaft 20 and housing 30 during operation and allowing seal 60 to inhibit passage of contaminants toward gap 80 and therefore axis 22.

Figure 3:
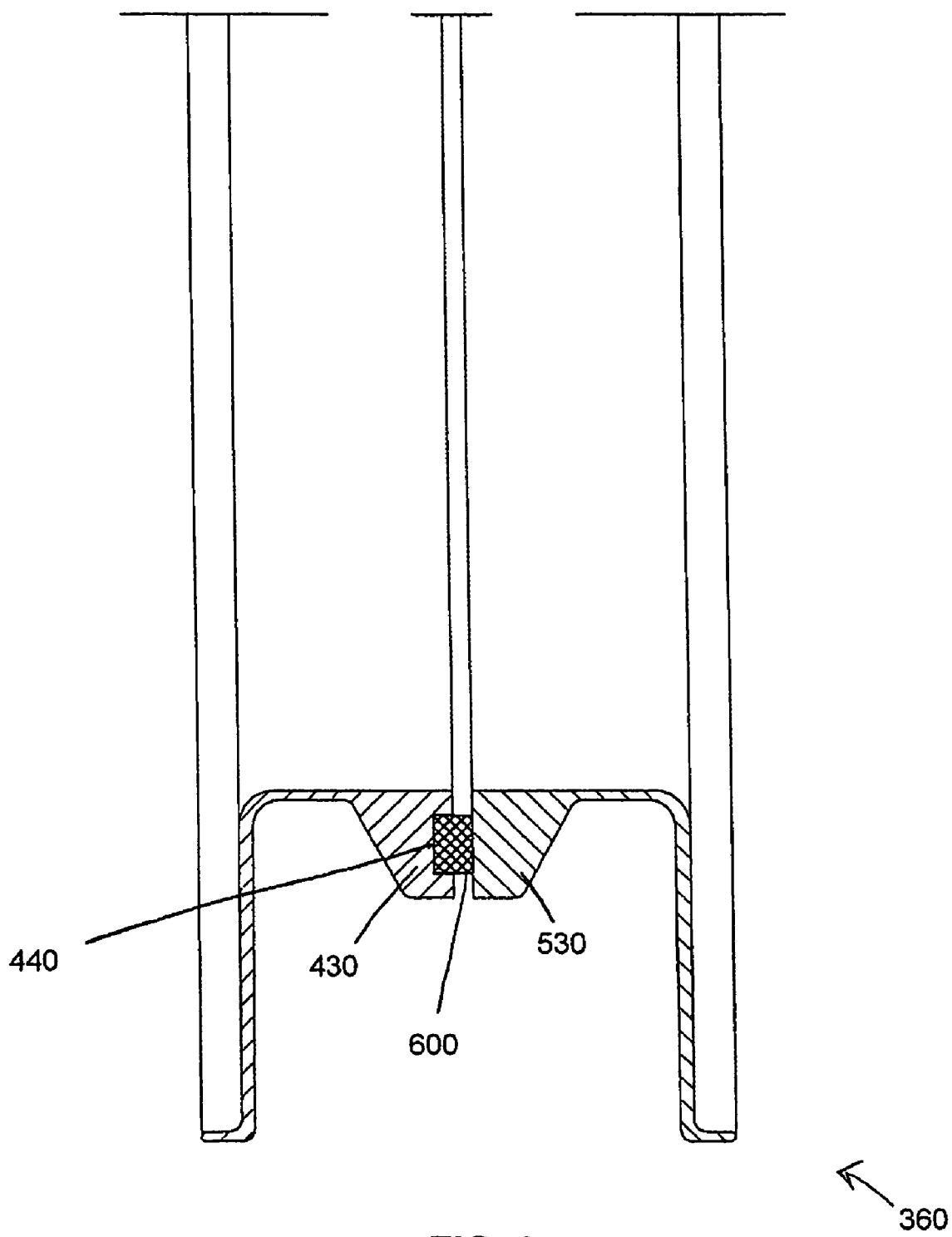
FIG. 3 is a top perspective view of an other embodiment of a seal in accordance with the present invention.

In another embodiment depicted in FIG. 3, a seal 360 includes the features described above for seal 60 except that a mating portion 430 and a second mating portion 530 include a low friction member 600 therebetween. The rotation of mating portion 430 and second mating portion 530 relative to one another is promoted by low friction member 600. In particular, low friction member 600 has a lower friction coefficient then mating portion 430 or second mating portion 530 thus allowing them to more efficiently rotate relative to one another.

Also, first mating portion 430 may include a circumferential groove 440 configured to receive low friction member 600. The pressure between mating portion 430 and second mating portion 530, when seal 360 is installed in cavity 40, may maintain low friction member 600 in a groove 440. Friction member 600 could also be a self-lubricating material. Examples of low friction or self-lubricating materials which may be utilized in friction member 600 include carbon, Teflon (e.g., Teflon impregnated nylon), oil impregnated nylon, or other plastics as will be known by those skilled in the art.

It will also be understood to one of ordinary skill in the art that seal 60 and seal 360 may be utilized between rotors and stators of various types which include cavities therebetween such that first portion 100 and second portion 200 may engage each other and such stators and rotors to provide a sealing affect from an exterior of such cavities.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method for sealing a cavity between a shaft and a housing, the method comprising:

inserting a seal into the cavity between the shaft and the housing;

engaging a first wall contacting portion of a first leg of a first monolithic member of the seal with the shaft such that the first member is substantially stationary relative to the shaft and to inhibit passage of contaminants from an exterior of the cavity through the cavity toward an axis of the shaft;

engaging a second wall contacting portion of a second leg of a second monolithic member of the seal with the housing to inhibit passage of the contaminants from the exterior of the cavity through the cavity toward the axis and such that the second member is substantially stationary relative to the housing;

the first leg having a first free axial portion and the second leg having a second free axial portion, the first leg having a first radial portion connected to the first axial portion and the second leg having a second radial portion connected to the second axial portion;

the first wall contacting portion connected to the first radial portion and the second wall contacting portion connected to the second radial portion, the first wall contacting and the second wall contacting portion extending away from each other;

engaging a first engaging portion of the first member and a second engaging portion of the second member with each other to inhibit passage of the contaminants from the exterior of the cavity through the cavity toward the axis such that the first engaging portion and the second engaging portion directly contact each other and such that the first member and the second member are rotatable relative to each other about the axis; and wherein the first leg and the second leg are axially separated from each other by an opening, the first leg having a first inner surface and the second leg having a second inner surface, the first inner surface and the second inner surface bounding an opening separating the first leg and the second leg from each other such that the seal avoids extending into the opening between the first free axial portion and the second free axial portion, and the first leg and the second leg avoiding contacting each other.

2. The method of claim 1 wherein the engaging the first leg with the shaft comprises engaging the first leg with the shaft to allow the first member to move with the shaft relative to the housing and the second member.

3. The method of claim 1 wherein the engaging the second leg with the housing comprises engaging the second leg with the housing to allow the second member to move with the housing relative to the shaft and the first member.

4. The method of claim 1 wherein the first foot engaging the shaft comprises said first foot engaging a shaft head portion of the shaft.

5. The method of claim 1 further comprising applying a stress to at least one of the first member and the second member to elastically deform the first member and the second member toward each other to allow the seal to be inserted into the cavity.

6. The method of claim 5 further comprising releasing the stress to allow the first member to engage the shaft and the second member to engage the housing.

7. The method of claim 5 wherein the applying the stress comprises applying a primary stress to at least one of the shaft and the housing to cause the stress to be applied to the at least one of the first member and the second member.

8. The method of claim 1 further comprising forming a groove in at least one of the first member and the second member, the groove configured to receive a low friction member for reducing friction between the first member and the second member in response to the first member and the second member rotating relative to each other.

9. The method of claim 1 wherein the engaging the first leg with the shaft comprises extending a first foot of the first leg substantially axially relative to the shaft to engage the first leg with the shaft.

10. The method of claim 1 wherein the engaging the second leg with the housing comprises extending a second foot of the second leg substantially axially relative to the shaft to engage the second leg with the housing.

11. The method of claim 1 wherein the first member and the second member are shaped symmetrically relative to each other about a line of symmetry about perpendicular to the axis of the shaft.

12. The method of claim 1 wherein the wall contacting portion of the first leg engages the shaft at a first position and the wall contacting portion of the second leg engages the housing at a second position, the first wall contacting portion and the second wall contacting portion being at about a same radial distance from the axis.

13. The method of claim 1 wherein the first member and the second member are shaped as mirror images of each other about a line about perpendicular to the axis of the shaft.

14. A method for sealing a cavity between a shaft and a housing, the method comprising:
    inserting a seal into the cavity between the shaft and the housing;
    engaging a first wall contacting portion of a first leg of a first monolithic member of the seal with the shaft such that the first member is substantially stationary relative to the shaft and to inhibit passage of contaminants from an exterior of the cavity through the cavity toward an axis of the shaft;
    engaging a second wall contacting portion of a second leg of a second monolithic member of the seal with the housing to inhibit passage of the contaminants from the exterior of the cavity through the cavity toward the axis and such that the second member is substantially stationary relative to the housing;
    engaging a first engaging portion of the first member and a second engaging portion of the second member with each other to inhibit passage of the contaminants from the exterior of the cavity through the cavity toward the axis and such that the first member and the second member are rotatable relative to each other about the axis and such that the first engaging portion and the second engaging portion directly contact each other;
    the first wall contacting portion and the first engaging portion located at opposite ends of the first member, and the second wall contacting portion and the second engaging portion located at opposite ends of the second member;
    the first leg having a first axial portion and the second leg having a second axial portion, the first leg having a first radial portion connected to the first axial portion and the second leg having a second radial portion connected to the second axial portion, the first axial portion extending from the first radial portion in a direction substantially opposite a direction the second axial portion extends from the second radial portion;
    the first wall contacting portion connected to the first radial portion and the second wall contacting portion connected to the second radial portion, the first wall contacting portion and the second wall contacting portion extending away from each other;
    applying at least one stress to at least one of the first leg and the second leg to elastically deform the first leg and the second leg toward each other into an opening bounded by the first leg and the second leg and separating the first leg and the second leg from each other; and
    elastically returning the first leg and the second leg away from each other to cause the first wall contacting portion and the second wall contacting portion to directly contact sides of the cavity to cause a frictional fit between the first leg and the shaft and a second frictional fit between the second leg and the housing; and
    transmitting at least a portion of the least one stress to cause the first engaging portion and the second engaging portion to remain in contact each other.

15. A method for sealing a cavity between a shaft and a housing, the method comprising:
    engaging a first monolithic member of a seal with a second monolithic member of the seal;
    inserting the seal into the cavity between the shaft and the housing;
    engaging a first wall contacting portion of a first leg of the first monolithic member of the seal with the shaft such that the first member is substantially stationary relative to the shaft and to inhibit passage of contaminants from an exterior of the cavity through the cavity toward an axis of the shaft;
    engaging a second wall contacting portion of a second leg of the second monolithic member of the seal with the housing to inhibit passage of the contaminants from the exterior of the cavity through the cavity toward the axis and such that the second member is substantially stationary relative to the housing;
    engaging a first engaging portion of the first member and a second engaging portion of the second member with each other to inhibit passage of the contaminants from the exterior of the cavity through the cavity toward the axis and such that the first member and the second member are rotatable relative to each other about the axis;
    the first wall contacting portion and the first engaging portion located at opposite ends of the first member, and the second wall contacting portion and the second engaging portion located at opposite ends of the second member;
    the first leg having a first axial portion and the second leg having a second axial portion, the first leg having a first radial portion connected to the first axial portion and the second leg having a second radial portion connected to the second axial portion, the first axial portion extending from the first radial portion in a direction substantially opposite a direction the second axial portion extends from the second radial portion;
    the first wall contacting portion connected to the first radial portion and the second wall contacting portion connected to the second radial portion, the first wall contacting and the second wall contacting portion extending away from each other;
    applying a plurality of stresses by at least one of the housing and the shaft to the first wall contacting portion and the second wall contacting portion to elastically deform the first leg and the second leg toward each other into a space separating the first leg and the second leg from each other; and
    transmitting the plurality of stresses from the first wall contacting portion and the second wall contacting portion to the first engaging portion and the second engaging portion to maintain the first engaging portion and the second engaging portion in contact with each other.

* * * * *